July 31, 1945.  W. E. KOPPLIN  2,380,653

METHOD OF REMOVING FINS FROM MOLDED PRODUCTS

Filed March 2, 1944

INVENTOR.
William E. Kopplin,
BY
Chritton Wiles Davies Schroeder & Merriam, Attys.

Patented July 31, 1945

2,380,653

UNITED STATES PATENT OFFICE 2,380,653

METHOD OF REMOVING FINS FROM MOLDED PRODUCTS

William E. Kopplin, Chicago, Ill., assignor to Crane Packing Company, Chicago, Ill.

Application March 2, 1944, Serial No. 524,813

6 Claims. (Cl. 51—282)

My invention relates to improvements in method of removing fins from molded products, such, for example, as rubber or artificial rubber.

As an illustration, reference is made to the fact that a flexible bellows of rubber or the like is used in providing a seal to prevent leakage of water or other liquid along the shaft of an automobile water pump. Such bellows are molded in two halves and there is usually a series of thin fins or "flash" projecting from the line where the two halves meet. The expense of cutting off or grinding off these projecting fins is excessive as now practiced.

The general object of the invention is to provide an improved method and means for quickly and conveniently removing such fins.

A contributory object is to provide a method through which use is made of a tumbler in which the molded products and small particles of wood or other material are agitated in a freezing atmosphere.

A further object is to provide a method which consists in tumbling in a receptacle, a quantity of the articles having fins to be removed and a quantity of dry ice, whereby said fins are frozen and knocked off, leaving a finished product.

In the accompanying drawing.

Figure 1:
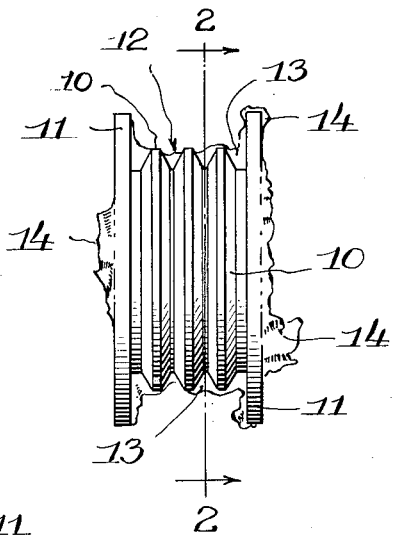
Fig. 1 is an elevational of a flexible bellows type seal, before the fins are removed.

In Fig. 1 the seal illustrated is made preferably of rubber or the like, such as would be used, for example, in the manner illustrated in the pending application of Frank E. Payne, Serial No. 522,405, filed February 15, 1944.

Figure 2:
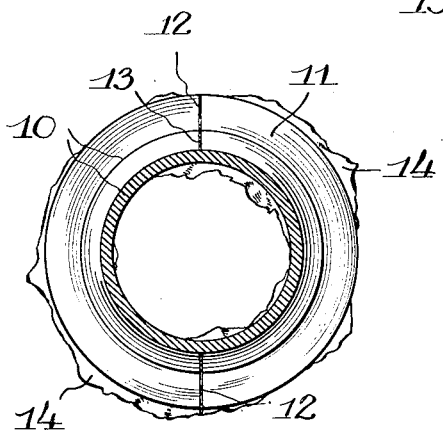
Fig. 2 is a section on the line 2—2 of Fig. 1.
Figure 3:
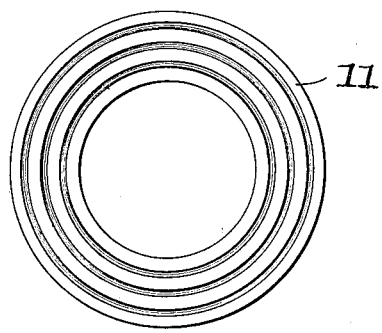
Fig. 3 is an end elevation of the finished seal.

It comprises a bellows portion 10 provided with integral end flanges 11, and is usually molded in two parts, the line where the two halves join being shown at 12 in Figs. 1 and 2.

During the molding operation a number of thin webs or fins 13, 14 are formed, due to the pressure applied, which causes any excess material to be extruded in this form, called "flash."

Heretofore the usual practice has been to tear off or trim off the flash by hand. This takes an unwarranted amount of time, considering the small size and low cost of the articles molded and the removal of the web 13 formed between the convolutions of the bellows is an inconvenient procedure.

In my improved process I tumble the molded articles in a rotatable container into which a certain amount of dry ice has been introduced, and in some cases additional small objects, such as wooden pegs. Any one of a great variety of foreign objects may be employed, as will be evident. During the tumbling operation the temperature is reduced sufficiently to render the flash brittle, and it is broken off, leaving a smooth surface which requires no further finishing operation. By way of example, only, the temperature may vary from about zero to forty below zero.

The time required varies with the size of the article and with the amount of dry ice or other freezing material employed. In the case of rubber bellows of conventional size intended to be used in water pumps, two thousand such articles may be tumbled with thirty pounds of dry ice for about twenty-five minutes, resulting in a finished product. A like number of such articles where finished by hand require many hours, or more than an entire day for a single operator.

The articles are not frozen sufficiently to impair the quality of the rubber body as a whole, but are frozen enough to render the flash more frangible than the remaining portions. This factor varies under different conditions. When small bellows or other articles are being finished, it is preferable to use a quantity of small foreign objects to aid in breaking off the flash in the more inaccessible locations, for example wooden pegs have proven satisfactory. With larger than the usual sizes no additional foreign objects need be used.

Any suitable tumbling apparatus may be employed and where wooden pegs are used they are afterwards separated from the finished product and from the dry ice on a table, conveyor or the like.

The invention is not limited to the treatment of articles of rubber or of rubber substitutes, as it is adapted for other articles of such character that freezing will render the flash more brittle than the main body of the article to be treated.

I claim:

1. The method of removing fins from products molded from an elastomer which comprises subjecting said products to sub-normal temperatures for a length of time such that said fins become brittle, but the remainder of said products retain their non-frangible characteristics, and tumbling the same in a container to break off said fins.

2. The method of removing fins from objects molded from flexible deformable material, which comprises reducing the temperature of said objects in a rotatable container to an extent whereat said fins are rendered brittle whereby contact of said objects with each other causes said fins to break off, leaving a smooth surface.

3. The steps in the method of removing fins from objects molded from flexible deformable material, which comprises reducing the temperature of said fins in a rotatable container to a predetermined point by exposing the fins to the action of a heat-abstracting substance for a sufficient length of time so as to render said fins more frangible than the thicker parts of the objects.

4. The method of removing fins from products molded from an elastomer which comprises tumbling said products with dry ice and with small objects which are less frangible than the fins at the temperature at which the fins are removed.

5. The method of removing fins from objects molded of flexible material which comprises reducing the temperature of said objects in an atmosphere having a range of from about zero Fahrenheit to forty below zero Fahrenheit in a rotating container, to render said fins more frangible than the thicker parts of said objects, whereby the contact of said objects with each other causes said fins to break off, leaving a smooth surface.

6. A method of separating thin extensions from the bodies of articles of appreciable thickness formed from material which is normally non-frangible at room temperatures, but which becomes frangible at much lower temperatures, comprising the steps of tumbling said articles in a low temperature environment for a period of time such that said extensions become brittle but the remainder of said articles retain to a substantial extent their non-frangible characteristics, the temperature of said environment being lower than the temperature at which said material is rendered frangible.

WILLIAM E. KOPPLIN.